United States Patent
Azarafrooz et al.

(10) Patent No.: US 10,664,597 B2
(45) Date of Patent: *May 26, 2020

(54) SHELLCODE DETECTION

(71) Applicant: Cylance Inc., Irvine, CA (US)

(72) Inventors: Mahdi Azarafrooz, Irvine, CA (US); Derek A. Soeder, Irvine, CA (US)

(73) Assignee: Cylance Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/507,958

(22) Filed: Jul. 10, 2019

(65) Prior Publication Data

US 2019/0332772 A1 Oct. 31, 2019

Related U.S. Application Data

(63) Continuation of application No. 15/806,229, filed on Nov. 7, 2017, now Pat. No. 10,482,248.

(60) Provisional application No. 62/419,922, filed on Nov. 9, 2016.

(51) Int. Cl.
  *G06F 12/14* (2006.01)
  *H04L 29/06* (2006.01)
  *G06F 21/56* (2013.01)
  *G06F 21/55* (2013.01)

(52) U.S. Cl.
  CPC ........ *G06F 21/566* (2013.01); *G06F 21/552* (2013.01); *G06F 2221/033* (2013.01)

(58) Field of Classification Search
  CPC . G06F 21/566; G06F 21/552; G06F 2221/033
  USPC .................. 726/23–25; 713/165, 188
  See application file for complete search history.

(56) References Cited

U.S. PATENT DOCUMENTS

| | | | |
|---|---|---|---|
| 8,307,432 B1* | 11/2012 | Feng | G06F 21/56 726/22 |
| 10,043,013 B1* | 8/2018 | Ferrie | G06F 21/552 |
| 10,482,248 B2* | 11/2019 | Azarafrooz | G06F 21/552 |
| 10,528,735 B2* | 1/2020 | Gorelik | G06F 21/566 |
| 2008/0022405 A1* | 1/2008 | Wang | H04L 63/1441 726/23 |
| 2010/0205674 A1* | 8/2010 | Zorn | G06F 21/552 726/25 |
| 2011/0197272 A1* | 8/2011 | Mony | G06F 21/566 726/12 |
| 2011/0219448 A1* | 9/2011 | Sreedharan | G06F 21/00 726/23 |
| 2011/0314544 A1* | 12/2011 | Shin | G06F 21/50 726/23 |
| 2013/0312093 A1* | 11/2013 | Hirvonen | G06F 21/554 726/22 |
| 2014/0173736 A1* | 6/2014 | Liu | G06F 21/566 726/24 |
| 2014/0181976 A1* | 6/2014 | Snow | G06F 21/53 726/23 |

(Continued)

*Primary Examiner* — Aravind K Moorthy
(74) *Attorney, Agent, or Firm* — Jones Day

(57) ABSTRACT

Identifying shellcode in a sequence of instructions by identifying a first instruction, the first instruction identifying a first bound of a sequence of instructions, identifying a second instruction, the second instruction identifying a second bound of the sequence of instructions, and generating a distribution for the sequence of instructions, bounded by the first instruction and the second instructions, the distribution indicative of whether the sequence of instructions is likely to include shellcode.

20 Claims, 9 Drawing Sheets

(56) References Cited

U.S. PATENT DOCUMENTS

| | | | |
|---|---|---|---|
| 2015/0363598 A1* | 12/2015 | Xu | G06F 21/563 |
| | | | 726/23 |
| 2016/0026581 A1* | 1/2016 | Muttik | G06F 12/1441 |
| | | | 726/26 |
| 2016/0275289 A1* | 9/2016 | Sethumadhavan | G06F 21/552 |
| 2016/0328560 A1* | 11/2016 | Momot | G06F 21/563 |
| 2017/0206357 A1* | 7/2017 | Gorelik | G06F 21/52 |
| 2018/0018460 A1* | 1/2018 | Brown | G06F 21/566 |
| 2018/0025158 A1* | 1/2018 | Malachi | G06F 21/566 |
| | | | 726/23 |
| 2018/0032728 A1* | 2/2018 | Spisak | G06F 21/6281 |

* cited by examiner

SHELLCODE DETECTION

RELATED APPLICATIONS

This application claims priority to U.S. patent application Ser. No. 15/806,229 filed on Nov. 7, 2017 which, in turn claims priority to U.S. Pat. App. Ser. No. 62/419,922 filed on Nov. 9, 2016, the contents of both of which are hereby fully incorporated by reference.

TECHNICAL FIELD

The subject matter described herein relates to techniques for controlling computer environments.

BACKGROUND

Many companies rely on computing systems and software applications to conduct their business. Computing systems and software applications deal with various aspects of companies' businesses, which can include finances, product development, human resources, customer service, management, and many other aspects. Businesses further rely on communications for a variety of purposes, such as, exchange of information, data, software, and other purposes. Computing systems/software are frequently subject to cyberattacks by viruses, malicious software or malware, and/or other ways that can be highly disruptive to operations of the computing systems/software. Malware can disrupt computer operations, gather sensitive information, and/or gain access to private computer systems. Malware is typically defined by its malicious intent and does not include any software that may cause unintentional harm due to some deficiency.

Detection of unwanted objects, such as malware, viruses, and other unwanted or untrusted objects, in an execution environment may be performed at a computer as part of endpoint detection of those unwanted objects. For example, an object, such as a file, document, program, and/or the like, may be analyzed as part of execution control to determine whether to allow execution of some portion of the object.

In one sense, shellcode is a type of malware that is embedded within an otherwise benign computer file. Computer files can be data, a program, a content file, an archive, an executable, a script, or the like. Shellcode is a piece of code typically used as a payload in the exploitation of software vulnerability. The shellcode can facilitate an unauthorized person or machine to control a computing system, causing the computer system to perform functions different from its legitimate function. Such control can be facilitated by allowing unauthorized remote access to the computer, disruption of the computing system, unauthorized transmission of data outside of the computing system, or the like. Any piece of code that is embedded within an otherwise benign-looking computer and has malicious intent can be referred to as shellcode.

An example of shellcode, polymorphic shellcode, is malware capable of disguising itself within an otherwise benign computer file. Polymorphic shellcode can be configured to mutate its internal structure in order to avoid detection. Such mutation may include analyzing the computer files and emulating the code structure of the computer files by inserting nonsense code, that resembles the computer files, within the shellcode, thus making the shellcode appear as though it is part of the computer file. The problem of reliably identifying a bounded-length mutating malware can be considered an NP-complete problem.

Some computer architectures, such as the Von Neumann computer architecture, may not be able to distinguish between instructions in the code and data in the code of a computer file. This characteristic can exploited by engineered malware to overwrite the stored control information in the file and facilitate the hijacking of the execution context of an intended process.

SUMMARY

In some implementations, the current subject matter relates to the detection, interception, and/or control of behaviors associated with shellcode.

In one aspect there is provided a method comprising one or more operations. The operations can include identifying a first instruction. The first instruction can provide the identity of a first bound of a sequence of instructions. The operations can include identifying a second instruction. The second instruction can identify a second bound of the sequence of instructions. The operations can include generating a distribution for the sequence of instructions, bounded by the first instruction and the second instruction. The distribution can be indicative of whether the sequence of instructions is likely to include shellcode.

In some variations, one or more of the features disclosed herein including the following features can optionally be included in any feasible combination. The first instruction can include an identification of a first location in memory. The second instruction can include an identification of a second location in memory. The first instruction can include a mnemonic indicative of a start of shellcode. The shellcode can include a position-independent instruction referencing the identity of the first location in memory. A position-independent instruction can include a reference to a location in memory previously specified by another instruction.

In some variations, the first instruction and the second instruction can be in a file. The identifying of the first instruction and the identifying of the second instruction can include disassembling a binary form of the file into code, the code having a higher-level representation when compared to the binary form. In some variations, the identifying of the first instruction and the identifying of the second instruction can include assigning a mnemonic to individual elements of the instructions of the file. The individual elements of the instructions can include at least the first instruction and the second instruction. The identifying of the first instruction can include identifying a first mnemonic associated with the first instruction. The identifying of the second instruction can include identifying a second mnemonic associated with the second instruction.

In some variations, the distribution can be a conditional probability distribution. A likelihood of whether the sequence of instructions is likely to include shellcode can be determined based on the distribution. The likelihood of whether the sequence of instructions is likely to include shellcode can be determined by a machine-learning model.

In some variations, the machine-learning model can be assumptionless as to a form of and as to a frequency distribution of one or more mnemonics within the sequence of instructions, based on observed distributions of the one or more mnemonics in a first section of the sequence of instructions. The machine learning model can determine, based on the observed distributions of the one or more mnemonics in a first section of the sequence of instructions, a prediction of the frequency distribution of the one or more mnemonics in a second section of the sequence of instructions. The machine-learning model can be a non-parametric and non-Markovian machine-learning model. In some variations, the machine-learning model can include a sequence memoizer. In some variations, the machine-learning mode can include an online inference model.

The determining of the likelihood can include assigning a score to the sequence of instructions. The score can be a perplexity score indicative of a level of difficulty to predict the distribution.

In some variations, the sequence of instructions can include instructions and data.

The sequence of instructions can be inclusive of one or more of the first instruction and the second instruction. The sequence of instructions can be exclusive of one or more of the first instruction and the second instruction.

Non-transitory computer program products (i.e., physically embodied computer program products) are also described that store instructions, which when executed by one or more data processors of one or more computing systems, causes at least one data processor to perform operations described herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
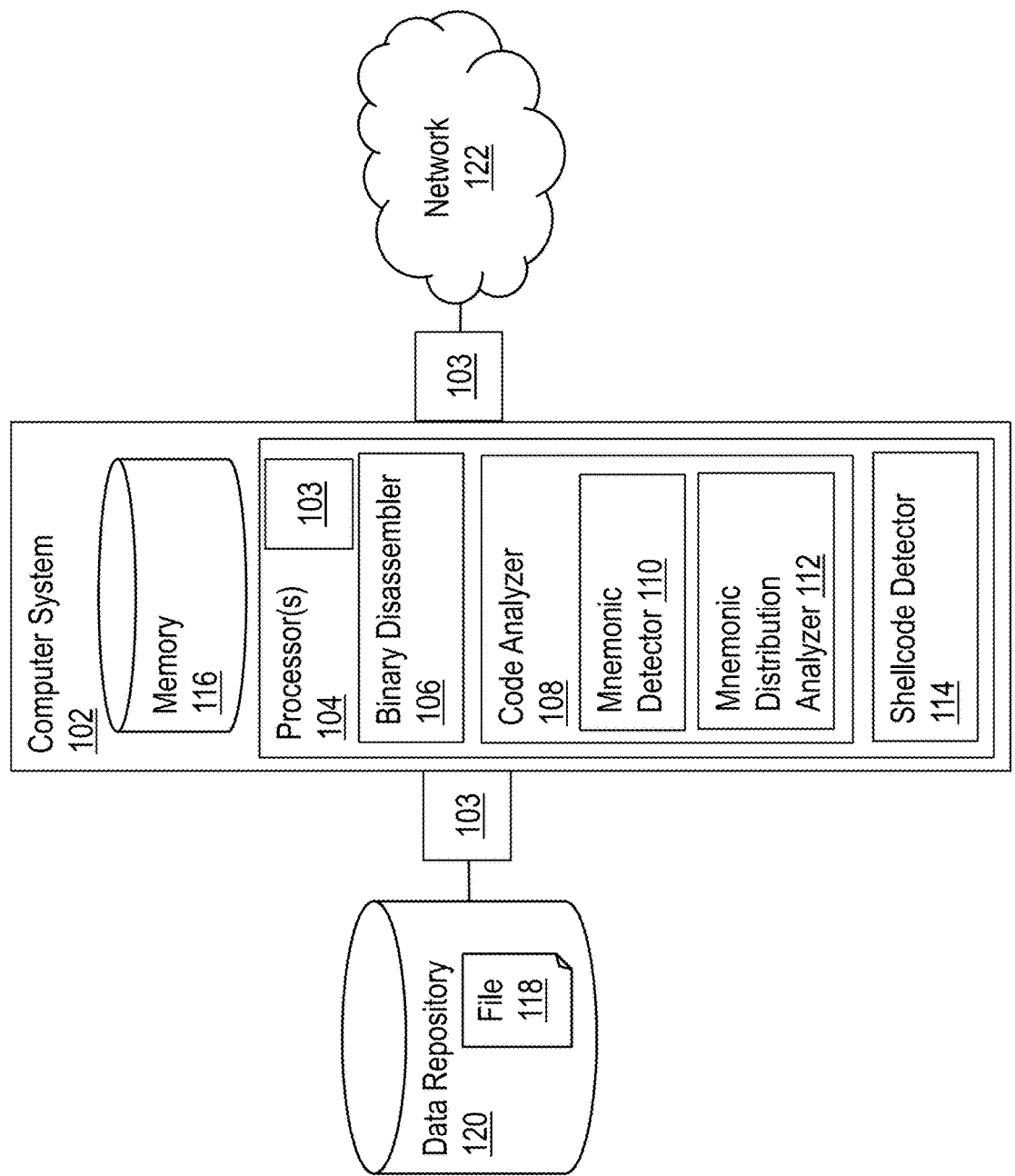
FIG. 1 illustrates an exemplary system that can perform processing of data to detect shellcode, in accordance with one or more features of the currently described subject matter.

Malware detectors have particular difficulty detecting malware (shellcode) and polymorphic malware (polymorphic shellcode) embedded within files, such as computer files. This is for example, because polymorphic malware attempts to disguise itself as being part of the original code of the computer files in which it is embedded.

Consequently, there is a technical problem in detecting shellcode, especially polymorphic shellcode, in computer files and preventing the shellcode from being executed. The presently described subject matter provides for shellcode detection by converting the binary code of a computer file into mnemonic code. The mnemonic code can include a series of mnemonics or tags. The distribution of mnemonics in the mnemonic code of a computer file can then be compared to the probabilistic distribution of mnemonics in benign computer code and/or shellcode to determine the likelihood that the computer file contains shellcode.

Shellcode and polymorphic shellcode, can be detected by analyzing the sequential probabilistic modeling of the code of the shellcode. By tolerating some amount of noise in detection, it is possible to design relatively low (in time and space) complexity machine learning (ML) detectors for these types of malwares. In contrast with the signature based methods, ML detectors have turned out to be the only "good-enough" options for achieving a tolerance of noise in detection of polymorphic malwares. This is especially the case with the advances in the scalable and cloud based analytics where the limited computing power of the host endpoints is no longer an issue.

Sampling based approaches are particularly difficult to implement in an online streaming context due to scaling and load balancing issues. Solutions that try to avoid scaling and load balancing issues often require assumptions that can be exploited by malicious code. Analyzing an entire computer file can be prohibitively time consuming and demanding with respect to processing ad memory resources. The presently described subject matter provides for the identification of those portions of a computer file that are capable of containing shellcode. The portions of the computer file that are incapable of containing shellcode can be ignored. By only analyzing a portion of the computer file, the time and resources required to detect shellcode may be reduced, which may increase the efficiency of the computer.

The presently described subject matter provides for the identification of shellcode portions that have not been detected previously. Shellcode portions that have been detected in the past can be found using white list detection. White list detection is not available for identifying previously unseen portions of shellcode. The presently described subject matter facilitates the identification of previously unseen shellcode portions that do not appear in a white list.

A non-parametric, non-Markovian Bayesian approach can be used for modeling the shellcode. A non-parametric approach, from the information theoretic perspective, can provide an unbounded prediction channel between past and future observations and therefore nothing, except computational barriers, stands in the way of calculating perplexity metrics. In information theory, perplexity is a measurement of how well a probability distribution or a probability model predicts a sample. Perplexity metrics for a probability model can be used to compare that probability model against other probability models. For this reason a non-parametric approach can be resource intensive, however this is tempered by only analyzing those portions of a computer file that are capable of containing shellcode or at least shellcode that can actually be executed (some shellcode may be positioned in a computer file in such a way as to be inert—inert shellcode would not pose a threat to the computer system).

The incidence of certain elements in code contained in suspected shellcode can be compared to the probabilistic modeling of those same elements in code from other parts of the computer file in which the suspected shellcode is embedded. An element of the code of a computer file can include at least a portion of a computer instruction, computer data, and/or other elements of a computer file. Machine-learning models can be configured to determine the probabilistic modeling of parameters in the code in generally benign computer files and also determine the probabilistic modeling of parameters in the code of shellcodes. When the computer, having been configured to use machine-learning models, encounters a sequence of elements in the code of a computer file having a probabilistic distribution similar to those in shellcode, the computing system can flag that sequence of elements as likely being shellcode.

FIG. 1 illustrates an exemplary computer system 102 that can perform processing of data to detect shellcode, in accordance with example embodiments as described herein. The computer system 102 can include one or more processors 104. The processor(s) 104 can be configured to execute machine-readable instructions to perform one or more operations dictated by the machine-readable instructions. Processor(s) 104 can include processors within a server, a client, processors in a cloud computing system, or the like. While processor(s) 104 are illustrated as logically and physically co-located with other components of the computer system 102, one or more processors may be logically and/or physically separate. In some examples, machine-readable instructions can be in the form of computer files. When shellcode is embedded in the computer files, the processor(s) 104, without shellcode detectors, may execute the shellcode introducing malware into the computing system 102.

The computer system 102 may have malware detectors 103 that are configured to detect malware. The computer system 102 may have a single malware detector 103 configured to detect malware in any computer file that comes into contact with the computer system 102. The computer system 102 may have a plurality of malware detectors 103 configured to detect malware coming into contact with different elements of a computer system 102. For example, malware detectors 103 may be disposed, logically and/or physically, at a connection to a network 122, a data repository 120, at a processor(s) 104, or the like.

In some instances, shellcode can be disguised and hidden from some malware detectors 103. Shellcode, especially polymorphic shellcode, can be disguised and/or disguise itself by changing the code structure of the shellcode to resemble the code structure of the computer file in which it is embedded. Polymorphic shellcode's code structure may be modified so that the binary form of the shellcode is changed but the malicious functionality of the binary code will remain the same.

Another method of shellcode obfuscation is to encrypt the shellcode. Encrypted shellcode requires a decoding routing appended to the shellcode to provide instructions on how to decrypt the shellcode at run time (when being processed by the processor(s) 104). The decoder would be a telltale sign of the presence of encrypted shellcode. Therefore, to avoid detection by standard malware detectors, the decoders associated with encrypted shellcodes can have mutated internal bodies. The mutation of the internal bodies of the decoders can be accomplished using various polymorphic transformations, for example, by inserting junk instructions, data, permutations, randomizations, and/or the like, into the internal bodies of the decoders.

FIG. 1 illustrates a binary disassembler 106, an analyzer 108, a mnemonic detector 110 and a mnemonic distribution analyzer 112. Although these elements are illustrated separately in FIG. 1, this is for illustrative purposes as the computer system 102 may include other additional components. Furthermore, although these elements illustrated in FIG. 1 are illustrated as software elements associated with the processor(s) 104, the functionality attributable to any of the elements illustrated in FIG. 1 can be performed by hardware, firmware, software, and/or the like. Any function described herein related to any element could be performed by any of the other elements described herein and/or by other elements.

The computer system 102 can be configured to detect shellcode, including polymorphic shellcode. The computer system 102 can be configured to analyze the computer file to detect shellcode embedded in the computer file. Shellcode having been introduced into a computer file as malware is less likely to have the same code structure as the rest of the computer file. Even in the case where the shellcode, such as polymorphic shellcode, has attempted to simulate the code structure of the rest of the computer file, the shellcode will likely include instructions and information at a different frequency than the rest of the computer file.

The computer system 102 can include a binary disassembler 106. The binary disassembler 106 can be configured to disassemble the binary form of a computer file into to a higher-level representation, such as lexical tokens or text.

Figure 2A:
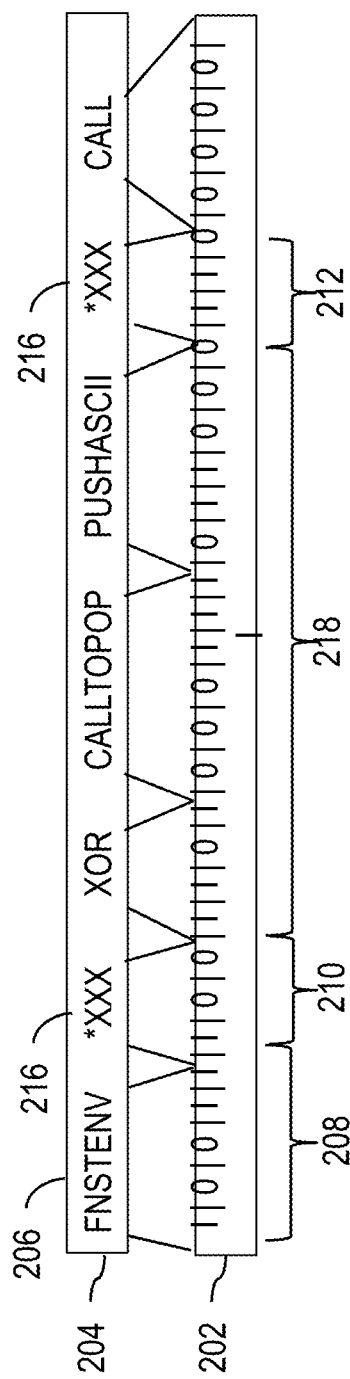
FIG. 2A illustrates a simple example of a binary form of a computer file dissembled into a higher-level language in accordance with one or more features of the currently described subject matter.

FIG. 2A illustrates a simple example of a binary form 202 of a computer file dissembled into a higher-level language, or code 204. The binary disassembler 106 can be configured to assign mnemonics 206 to elements 208 defined by the binary form 202 of the computer file. Mnemonics can be tags assigned to individual elements of the binary form 202 of the computer file. In some variations, different tags may be assigned to different elements of the binary form 202 of the computer file. In other variations, the same tag may be alternatively or additionally assigned to elements belonging to the same group or having the same type. For example, every element of code that references an address can be assigned the same tag. Individual elements in the binary form 202 of the computer file can be binary strings forming part of the computer-instructions or computer data. In some variations, the code 204 can be process using one or more representations. For example, the code 204 can be represented as mnemonics in the form of strings of text.

The binary disassembler 106 can follow one or more conventional standards that define how to convert the binary strings into code 204. The binary form 202 of the computer file can include a plurality of binary codes 208. Binary code can be fixed-width binary code or variable-width binary code. In fixed-width binary code, each element is typically represented by a bit string of the same length. A bit string can be interpreted as a binary number and usually displayed in code tables in octal, decimal, or hexadecimal notation. A bit string, interpreted as a binary number, can be translated into a decimal number. For example, the standard ASCII bit string for a lower case a is 01100001. This can also be interpreted as the decimal number 97. In variable-width binary code, each element can be represented by bit strings of differing lengths.

The computer system 102 can include a code analyzer 108. The code analyzer 108 can be executed by the processor(s) 104 of the computer system. The code analyzer 108 can include a mnemonic detector 110. The mnemonic detector 110 can be configured to read the code 204 of the computer file and determine individual mnemonics, or tags, within the code 204 of the computer file. As used herein mnemonics may be referred to as tags.

Figure 2B:
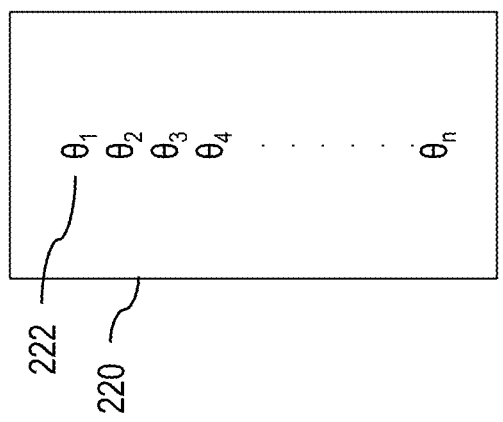
FIG. 2B illustrates a table showing the distribution of mnemonics within a portion of a computer file as determined in accordance with one or more features of the currently described subject matter.

FIG. 2B illustrates a table 220 including a representation of the distribution of mnemonics 222 within a portion of a computer file. The computer system 102 can include a mnemonic distribution analyzer 112. The mnemonic distribution analyzer 112 can be configured to analyze the distribution of mnemonics 222 in the code 204 of a computer file. The mnemonic distribution analyzer 112 can be configured to determine when the mnemonic distribution 222 of a portion of the code 204 of the computer file is indicative of a portion of the code 204 that does not fit well with the rest of the code 204 of the computer file. Detection of a portion of the code 204 of the computer file having a mnemonic distribution different from the rest of the computer file can indicate that that portion of the computer file is likely to include shellcode, or malware.

The code analyzer 108, and/or components thereof, can be configured to use one or more machine-learning models. The machine-learning models selected for use by the code analyzer 108 can be configured to devise complex models and algorithms that lend themselves to determining the typical distribution of mnemonics 206 within benign computer files as well as the typical distribution of mnemonics 206 within malware embedded in computer files as shellcode. The machine-learning models may include one or more types of algorithms, for example, neural networks, support vector machines, logistic regressions, scorecard models, Bayesian algorithms, decision trees, and/or the like.

Training of the code analyzer 108 can include one or more methodologies. Training the code analyzer 108 can refer to generating one or more machine-learning models from sample data. For example, a plurality of computer files can be introduced to the code analyzer 108. The computer files can be a mixture of benign computer files containing no malware and computer files containing malware, including shellcode. Over time the machine-learning models of the code analyzer 108 can build off experience to recognize patterns that would indicate the existence of malware, such as shellcode, embedded within otherwise benign computer files. The machine-learning models of the code analyzer 108 can recognize the probabilistic distribution patterns of code in normal benign computer files as well as the probabilistic distribution patterns of code in shellcode.

The mnemonic distribution analyzer 112 can be trained to find the conditional probabilistic distribution of mnemonics within the code 204 of the computer file. The computer system 102 can include a shellcode detector 114. The shellcode detector 114 can be configured to detect the presence of shellcode within a computer file based on the analysis performed by the code analyzer 108 and in particular the determination of the distribution of mnemonics determined by the mnemonic distribution analyzer 112.

Analyzing the entirety of the code 204 of a computer file can be time consuming and resource intensive. This can lead to impracticable timeframes where some computer files may be unavailable. In some variations, to reduce the time it takes to analyze the code 204 of a computer file the code analyzer 108 can be configured to select portions of the code 204 of the computer file to analyze. Portions of the code 204 of the computer file can be selected in a variety of ways. For example, to select a portion of the code 204 of the computer file to analyze for shellcode, the mnemonic distribution analyzer 112 can be configured to locate code that identifies locations in memory of computer system 102. Portions of the code 204 of the computer file that include instructions that identify locations in memory are indicative that those portions are original to the computer file. Shellcode, because it not original to the computer file, will include instructions that do not include the identities of actual locations in memory. Instead, shellcode will include position-independent instructions. Position-independent instructions are instructions that reference locations in memory relative to the location in memory of the original instruction or an associated instruction. The rest of the computer file can be ignored. By concentrating on only the portion of the code disposed between two instructions that identify actual locations in memory, the amount of computational resources and the time required to analyze the computer file is greatly reduced without reducing the effectiveness of the shellcode detection analysis.

Different domains benefit from the different probabilistic representation of uncertainty. For example, in the case of deep neural networks applied to pattern recognition problems, there might be no clear advantage for overtly introducing uncertainty in the structure of parameters of those neural networks. In contrast, uncertainty is a key ingredient in the design of machine learning approaches for polymorphic malware detection due to the uncertain nature of polymorphic malware. Machine learning approaches for polymorphic malware detection can include a Bayesian approach, a non-parametric approach, or the like. The Bayesian approach has a rich representational power for uncertainty. The Bayesian approach may be considered free of the overfitting concerns that come with the deep learning and other non-Bayesian approaches. This can be considered important in polymorphic malware detection because any model that performs any fitting will likely fail with a targeted and careful manipulation of the learning feature sets. A Bayesian approach can avoid overfitting by taking the average over the entire space of uncertainties. Furthermore, the Bayesian approach can have certain advantages when limited data exists for analysis. Shellcodes may include only a small sequence of instructions (for example, tens or hundreds of instructions) and therefore a Bayesian approach to analyzing the computer file can reveal shellcode where other approaches may fail to do so.

The machine learning models can be used to generate a perplexity metric. A perplexity metric represents a determination of how hard a prediction problem is. This metric can be used to detect the confusion introduced by polymorphic transformations. The perplexity metric for a block of code that contains polymorphic transformations will tend to indicate a harder prediction problem compared to a block of code that does not contain polymorphic transformations. "Block of code" can refer to a sequence of instructions which need not be contiguous in memory. A sequence of instructions can be received over a network, located in memory, distributed across the memory, distributed across multiple memory devices, or the like. The problem of calculating perplexity metrics in the shellcode context has challenges. The challenge is that shellcode instructions typically comprise a very small sequence of instructions compared with the rest of the benign functions into which they have been injected. Deploying a global model that detects the shellcodes across an entire computer file, and all computer files may be impracticable due to the vast amount of irrelevant and diverse information contained in the non-affected part of the computer files.

To tackle this challenge, the computer system 102 can be configured to generate mnemonic-specific models for each type of mnemonic. Using mnemonic-specific models allows for the testing of the instruction sequence of suspected shellcode in isolation, independent from the rest of the benign functions contained in the computer file. This stems from the fact that shellcodes are position independent. The code analyzer 108 can be configured to assign a virtual mnemonic, for example, *XXX, to any instruction with a displacement and/or immediate field that appears to be a valid address in memory. Consequently, the analysis of the potential shellcode is limited to the set of mnemonics bounded between *XXX. Code that includes hard-coded references to a valid address on a disk image is indicative of being original code. Shellcode typically would not need to reference that address. Therefore, to function, the absence of hard-coded references to addresses shellcode can only be embedded after the first hard-coded reference to a valid address in memory.

The extracted instructions tend to have a size of only between tens and a few hundreds of mnemonics. In FIG. 2A, reference numbers 210 and 212 illustrate representations of two binary strings that are hard-coded references to one or more locations in memory. The binary disassembler 106 can be configured to assign a virtual mnemonic 216 to the binary strings 210 and 212. The virtual mnemonics 216 can indicate the bounds of an area of interest for the code analyzer 108.

The code analyzer 108 can be configured to analyze the block 218 of code 204 of the computer file that is between the two hard-coded references 210 and 212 to the one or more locations in memory, having the associated virtual mnemonic 216. The code analyzer 108 can be configured to analyze the code in the block 218 and forgo analysis of the rest of the computer file, thereby drastically reducing the computational requirements with respect to processing and memory and the time it takes to analyze a computer file for shellcode.

The frequency of machine instructions can be considered to follow Zipf's law. Zipf's law is an example of power law behavior. Zipf's law accounts for the frequency of words within written text. This law is pervasive and is found to follow Internet file sizes, social network graphs, family names, and the like. The same law rules have been observed in the frequency of popular mnemonics used in machine-readable instructions. This quality of machine-readable instructions can be exploited to detect machine-readable instructions that do not follow these laws, indicating that the non-conforming machine-readable instructions may be malware.

Figure 3:
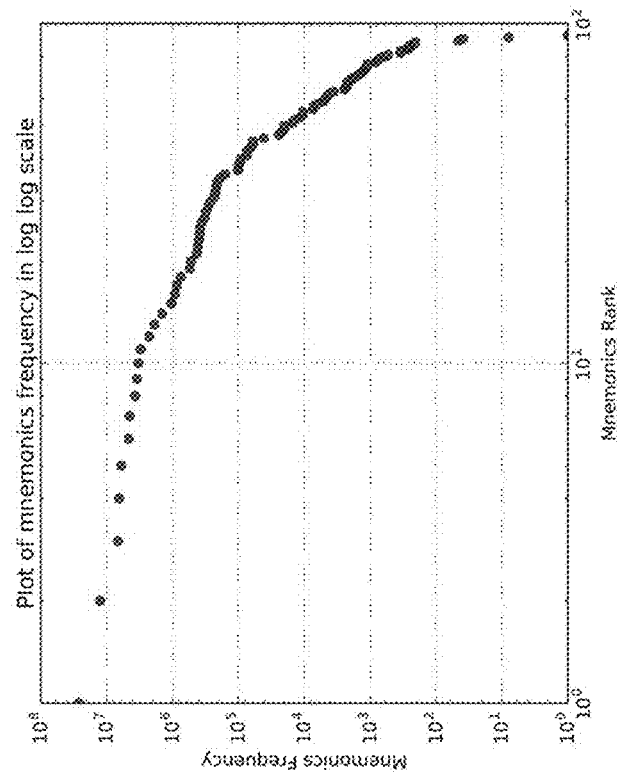
FIG. 3 shows a graph of the logarithm (Log) of frequency of observed mnemonics obtained from sixteen thousand disassembled files, using one or more features of the currently described subject matter.

For example, let $\mathcal{Y} = \{y_1, y_2, \ldots, y_n\}$ be a finite or countable set of X86 mnemonics having a size n, let Y be a random variable taking values $\mathcal{Y}$ in with distribution $P(Y=y_i)$. In some variations, the computer system 102 can be configured to rank the groups of mnemonics in the files from the largest (most common group of mnemonics) to the smallest (least common group of mnemonics). Zipf's law states that the probability $p(y_i)$ that a given mnemonic falls in the i-th most populated rank i=1, . . . n, falls off as:

$$p(y_i) = \frac{i^{-\gamma}}{Z}$$

with Z being the normalization constant, i.e., $Z = \Sigma_{i-1}^{n} i^{-\gamma}$. FIG. 3 shows a graph of the Log of frequency of observed mnemonics obtained from sixteen thousand disassembled files, processed by one or more features of the present subject matter.

An example of symbols representing mnemonics can $\mathcal{Y}$ be ={CLD, WAIT, LODS, XOR, JMP, RET, TEST, CMP, JNZ, ADD, INC, DEC, SUB, JZ, ROR, LEA, OR, JCXZ, JC, LEAVE, JL, FNSTENV, JCXZ, JECXZ, JRCXZ, LODSB, LODSD, LODSQ, LODSW, LOOP, LOOPNZ, LOOPZ, CALL, CALLIMP, POP, PUSH, MOV, ROL, SHR, JNG, NEG, SBB, STOSB, CALLTOPOP, PUSHASCII, ZERO, *XXX}.

CALLTOPOP is a "CALL rel32" instruction that targets a "POP reg" instruction and is the only CALL to target that particular POP. PUSHASCII is a "PUSH imm32" instruction that pushes four printable ASCII bytes; e.g., PUSH 0xZZYYXXWW, wherein WW, XX, YY, and ZZ are each in the range 0x20 through 0x7E. ZERO is an AND, MOV, SUB, or XOR instruction that zeroes a register. *XXX is an instruction with a displacement and/or immediate field that appears to be a valid address in memory 116. CALLIMP: is a "CALL mem" instruction in which the memory operand corresponds to an imported function. This is a small example of the virtual mnemonics that can be used in the detection of shellcode. Any virtual mnemonic can be used, including those that do not follow ASCII conventions.

Figure 4:
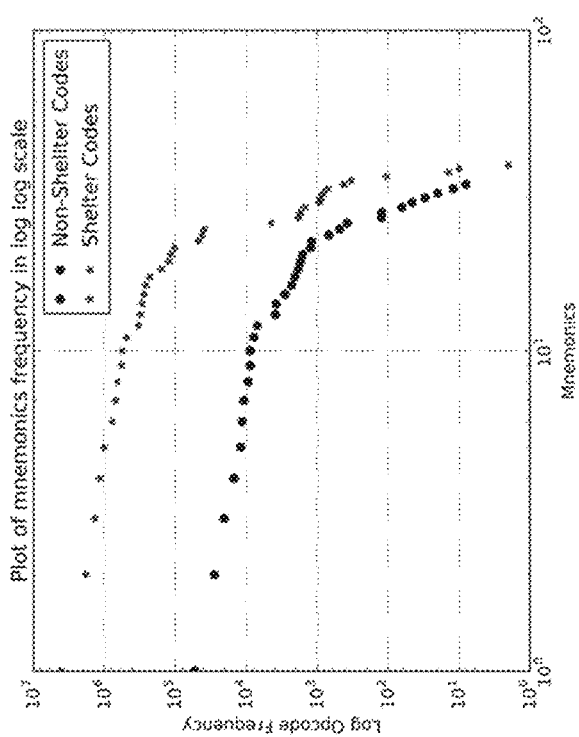
FIG. 4 illustrates a Log frequency of observed mnemonics obtained by disassembling three hundred shellcodes using one or more features of the currently described subject matter.

FIG. 4 illustrates a Log frequency of observed mnemonics obtained by disassembling three hundred shellcodes using one or more features of the currently described subject matter. The change in the exponent of the plot reveals the likelihood that a detected pattern of mnemonics, bounded by *XXX symbols, is part of a shellcode.

The entropic properties of the power law distributions are intimately linked with the behavior of the Riemann Zeta function $$\zeta(\gamma) = \sum_{k=1}^{\infty} \frac{1}{k^\gamma}.$$

However, entropic analysis would not benefit the shellcode detection as the entropy decay is not sharp enough around the exponent value $\gamma \gg 1$ of mnemonics.

The mnemonic distribution analyzer 112 can be configured to make the assumption that mnemonics are generated using a power law distribution, $$p(y_i) = \frac{i^{-\gamma}}{z}$$

in an independent and identically distributed (i.i.d) model. The mnemonic distribution analyzer 112 can be configured to determine $\Sigma_{i=1}^{1} -\log(p(y_i))$, which is the log-likelihood of symbols generated according to an independent and identically distributed probabilistic model.

Using this log-likelihood term is sufficient to detect a majority of the shellcodes in the first instance. Calculating $\Sigma_{i=1}^{n} -\log(p(y_i))$ is equivalent to calculating the exponent of the power law. It has been observed that shellcodes have higher exponents compared to benign, or original, code due to the use of uncommon mnemonics in shellcode, and therefore shellcode has lower log-likelihood in comparison to non-shellcode.

Determination of perplexity metrics can reveal the existence of shellcodes within a computer file. Shellcode typically consists of short sequences of mnemonics with a sparse set of observed mnemonic symbols. Calculating the perplexity for short sequences and sequences with a sparse set of observation symbols is challenging. The existence of various sharp likelihoods prohibits the reflection of true uncertainty and leads to numerous false positives. Moreover the Markov modeling remedy for having sharp likelihoods around exact observation fails in the case of polymorphic shellcodes.

A non-parametric, non-Markovian Bayesian approach can be used for modeling the sequence of instructions in shellcode. A non-parametric approach, from the information theoretic perspective, can provide an unbounded prediction channel between past and future observations and therefore nothing, except computational barriers, stands on the way of calculating the perplexity metrics. Moreover the non-Markovian modeling captures the long range dependency of the polymorphic transformations so that no contextual information is lost.

In a non-Markovian Bayesian model, there is no latent state and the likelihood of every observation gets calculated according to the condition distributions of n-grams. Furthermore, a non-Markovian Bayesian model can do away with the Markov assumption. A machine learning model can be trained on the data extracted by the non-Markovian Bayesian approach and therefore is possible to drop the Markov assumptions. Such a machine-learning model can be assumptionless as to a form and as to a frequency distribution of one or more mnemonics within a block of code.

The mnemonic distribution analyzer 112 can be configured to analyze the condition distribution of parameters in the portion 218 of the code 204 of the computer file. A shellcode detector 114 can be configured to determine the existence of shellcode in a computer file based on the analysis by the mnemonic distribution analyzer 112, using one or more techniques described herein.

The following describes a probabilistic approach using a non-parametric, non-Markovian, Bayesian approach to the detection of shellcode within a computer file.

As an example, the sequence of disassembled mnemonics as determined by a binary disassembler 106 can be provided as $x = x_1, x_2, \ldots, x_N$. Where $\Sigma$ is the set of symbols that $x_N$ can take, the number of times that a particular mnemonic, S $\in \Sigma$, occurs in x can be represented by N(s) and its corresponding frequency of occurrence can be represented as G(s), where $$G(s) = \frac{N(s)}{\sum_{s' \in \Sigma} N(s')}.$$

If an assumption is made that x is generated according to an independent identical distribution (i.i.d), then the discrete distribution over the elements of x is sufficient to detect the shellcodes.

More advanced shellcodes may be able to avoid detection by this method. These shellcodes that have complicated infection strategies insert junk sequences of mnemonics in their body to avoid the detection. To account for such contextual dependencies in the body of machine instruction associated with the shellcode, a sequential probabilistic modeling can be considered by studying different combinatorial sequences of instructions $u \in \Sigma^*$, where $G_u(s)$ represents the probability of observing symbol s right after subsequence u. Studying the underlying stochastic process via $G_u(s)$ is not a straightforward problem for shellcode detection. Markovian and maximum likelihood estimation approaches can suffer from smoothing problems due to the existence of powerlaw characteristics, long-range dependencies of machine instructions as well as shellcodes having a small sequence of infected codes.

A sequence memoizer can be used that can account for the small sequence of infected codes as well as the long-range dependencies of machine instructions. A sequence memoizer can be perceived as a non-parametric non-Markovian approach defined by imposing Hierarchical Pitman-Yor Processes on the conditional probability parameters $G_u(s)$, as follows:

$$P(X_{1:N}) = \Pi_{i=1}^{N} P(x_i | x_{1:i-1}) = \Pi_{i=1}^{N} G_{x_{1:i-1}}(x_i)$$

$$G_\in \sim PY(\alpha_\in, d_\in, H)$$

$$G_u | G_{\sigma(u)} \sim PY(\alpha_u, d_u, G_{\sigma(u)}) \forall u \in \Sigma_n^* \backslash \in$$

$$x_i | x_{i-n:i-1} = u, G_u \cdot G_u \; \forall_i = 1, \ldots, N$$

where $\sigma(u)$ is the sequence obtained by dropping the first symbol in u, $PY(\alpha_u, G_u)$ represents the Pitman-Yor process with discount parameter $d_u$, concentration parameter $\alpha_u$ and base distribution $G_u$. The sequence memoizer is a model for discrete sequence data that captures long range dependencies and power-law characteristics while remaining computationally attractive.

Figure 5:
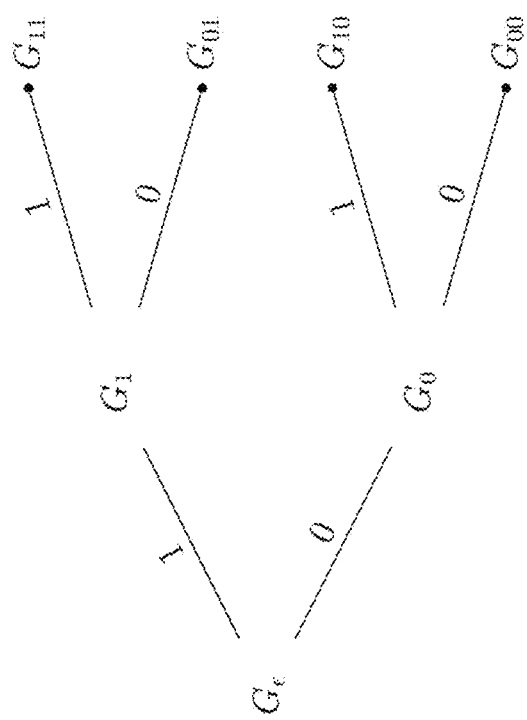
FIG. 5 is an illustration of the base distribution $G_u$ according to one or more features of the currently described subject matter.

FIG. 5 is an illustration of the base $G_u$ distribution according to some implementations of the current subject matter. Using a backward-filtering-forward-sampling algorithm trained on the entire set of computer instructions, the model parameters can be computed:

$$G_u | x_{1:N}, \; \forall u \in \Sigma^*.$$

The entire sequence can then be parsed using the *XXX to M position independent sequence of machine instructions $x^{um}, \forall m \in \{1, \ldots, M\}$. The following perplexity metric can be calculated to define an acceptable threshold for non-shellcode portions of the at least a portion of the computer file being analyzed by the code analyzer 108:

$$l(x^{u_m}) = -\frac{\log\left(\prod_{i=1}^{|x^{u_m}|} G_{x_{1:i-1}^{u_m}}^{u_m}(x_i^{u_m} \mid x_{1:N})\right)}{|x^{u_m}|},$$

$\forall m \in \{1, \ldots, N\}$.

The shellcode detector 114 can be configured to flag any sequence of mnemonics that yields a perplexity higher than a predefined threshold as a shellcode. The threshold can be referred to as a log-likelihood threshold or a perplexity threshold. The log-likelihood/perplexity threshold can be a hardcoded value that has been selected by examining across various good and bad files.

The presently described machine learning model can be trained on the whole sequence of mnemonics found in the bounded portion of code. For example, a sequence of mnemonics may include CLD, WAIT, LODS, XOR, JMP, RET, TEST, CMP, JNZ, ADD, INC, DEC, and *XXX. A machine learning model, once trained, can provide a likelihood of seeing the sequence of instructions CLD, WAIT, LODS, XOR, JMP, RET, TEST, CMP, JNZ, ADD, INC, DEC, and *XXX in a sequence of instructions.

The machine learning model can be tested against subsequent instructions within the bounded portion of instructions, thus generating different models for different mnemonics. For example, a sequence of mnemonics may include CLD, WAIT, LODS, XOR, JMP, RET, TEST, CMP, JNZ, ADD, INC, DEC, and *XXX. A machine learning model can be generated for XOR. The machine learning model can be trained to determine a likelihood of XOR appearing in a sequence of instructions. Once trained, the machine learning model for XOR can give a likelihood of XOR appearing in a sequence of instructions given that CLD, WAIT, and LODS have already been seen in the sequence of instructions. Another machine learning model can be generated for JMP. The machine learning model can JMP, once trained, can provide a likelihood of JMP appearing in a sequence of instructions given that CLD, WAIT, LODS, and XOR have already been seen in the sequence of instructions.

A bounded portion of instructions can include instructions appearing between two instructions. The two instructions being instructions indicative of the start and end of a sequence of instructions that could contain shellcode.

In some embodiments for online shellcode detection in streaming data, sequential observations of mnemonics may be given as $y_1, y_2, \ldots, y_N$. Shellcode can be detected using an online inference algorithm. Given the sequential observations and a generative model, the objective of an online inference algorithm can be to construct a sequence of prediction strategy $Q(x_1), Q(x_2), \ldots, Q(x_N)$, in order to minimize one or more regret metrics which are defined over the loss functions l(Q) such as the one in the following equation:

$$R_N \equiv \sum_{n=1}^{N} l_n(Q_{x_n}) - l_n(S_{x_n}), S \in S$$

where S is the set of static strategies at the environment's hands. It can then get cast as a repeated game between a forecaster and the environment, where the forecaster plays the prediction strategy Q as the solution to the following minimax function:

$$\min_{Q \in Q} \max_{x \in X} \max_{S \in S} R_N$$

Figure 6:
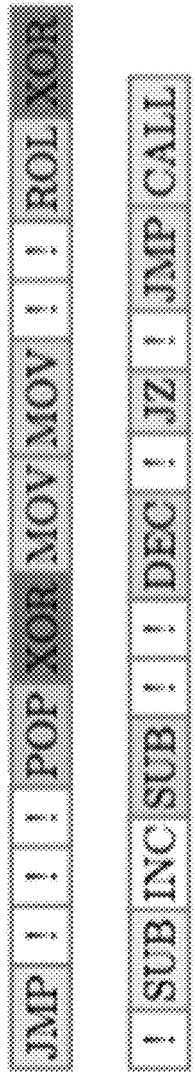
FIG. 6 illustrates an example of a block of code detected using one or more features of the currently described subject matter.

The prediction strategy Q is observation oriented, but the environment strategy can be arbitrary and dynamic. The environment can be considered a polymorphic engine or malware writer that intends to avoid getting detected by inserting junk instructions or creating patterns of machine instructions. The problem of changing every single observable and maintaining the malicious logic of the binary at the same time can be considered an NP complete problem. Consequently, as far as the online inference minimizes the defined regret metric, there is an ability to detect the footprint of polymorphic shellcodes. This is achieved by letting $$V_N^x = \sum_{n=1}^{N} \|x_{n+1} - x_n\| \; V_N = 0$$

measure the temporal change of the environment. When the optimal prediction strategy Q is the best static posterior with the full knowledge $V_N$ of the batch of data $y_1, y_2, \ldots, y_N$. There are various situations where the environment cannot be considered stationary. A similar argument applies to discerning malicious machine instructions from the junk ones (represented by ! instructions in FIG. 6 which illustrates an example of a block of code detected using one or more features of the currently described subject matter). In these cases, with non-zero and even very large values of are expected.

Another case of note is when the strategies parameters form a simplex. One way to parameterize the probabilistic space of environment strategies is by placing the Monte Carlo particles on the vertices of the simplex and restrict the parameters to the corners of the simplex.

$$S_n = \{S_{x_n}^k : k \in 1, \ldots, K\} \text{ i.e.,}$$

Figure 7B:
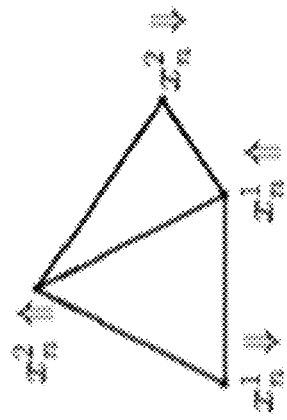
FIG. 7B illustrates an example of a n-simplex $S_n$ with variational Monte Carlo particles with hidden states $\Uparrow, \Downarrow$ as vertices as used by one or more features of the currently described subject matter.
Figure 7A:
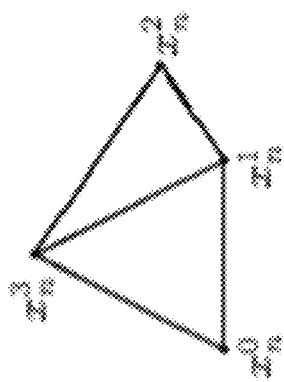
FIG. 7A illustrates an example of an n-simplex $S_n$ with sequential Monte Carlo particles as vertices as used by one or more features of the currently described subject matter.

FIG. 7A illustrates an example of a simplex with $S_n$ sequential Monte Carlo particles as vertices. In this particular case, the shifts $V_N^x$ correspond to the number of the times that the simplex trajectory (i.e., the sequence of elements against which the regret is evaluated) moves to a different corner.

One Bayesian approach is to impose a symmetric Dirichlet prior to the particles (parameters). This online inference approach can then yield a sequential MC followed by a Laplace estimator which can compute the particle weights according the following equation:

$$W_n^k \propto \frac{\mathcal{F}_n(x_n^k)}{\phi(x_n^k \mid x_{n-1}^k)} \cdot \frac{N_n(x_n^k) + 1}{N + K}$$

where $N_n(x_n^k)$ denotes the number of times the particle $x_n^k$ appears in the sequence $x_{1:n}$ and K is the number of particles.

Aside from the well know degeneracy issues of the sequential MC method, this approach suffers from smoothing problems. The smoothing problems may disappear by observing enough data but by the time the algorithm has observed enough data, the prediction errors have propagated all through the future pre-dictions. The smoothing requirements are bolder especially if the underlying observations as $y_1, y_2, \ldots, y_N$ have long tail distributions such as power-law distributions.

To empower both the inference and online learnability, the restriction on environment space parameters can be relaxed to cover the entire simplex rather than just the corners, i.e., $S_n$ $$\{S_{w_n^k,m} : k \in 1, \ldots, K, m \in 1, \ldots, M_n\} = ,$$

where $M_n$ is the number of hidden states at sequence index n and K is the number of particles. The online Mirror Descent (MD) algorithm framework can be introduced to the previous formulations:

$$\hat{w}_{n+1} = \underset{w_n \in \Delta K \times M_n}{\operatorname{argmin}} \, \zeta_n \langle w_n, \nabla_w l_n \rangle + D(w_n \| \hat{w}_n)$$

where $\nabla_w$ is the gradient with respect to w, $\zeta_n$ is the step size parameter and D is the Bregman divergence and $w_n$ are parameters of the environment space defined in:

$$\Delta^{K \times M_n} : \{w_n \in [0,1]^{K \times M_n} : \|w_n\|_1 = 1\}.$$

FIG. 7B illustrates an example of an n-simplex $S_n$ with variational Monte Carlo particles with hidden states, ⇑,⇓ (up-down states of the Monte Carlo particles), as vertices. A hidden state $\hat{W}_{n+1}$ can be perceived as a first-order loss decrease optimization problem with relative entropic regularizer. Particular importance is put on the KL regularizers. The variational Monte Carlo particles can be put on the vertices of the simplex illustrated in FIG. 7B. The relative entropy regularizer can be replaced with the free energy regularizer L[Q] defined below:

$$\log(Z) = KL[Q \| P] + \mathcal{L}[Q]$$

$$\mathcal{L}(Q) = \sum_x Q(x) \log \frac{\mathcal{F}(x)}{Q(x)}.$$

$V_n^k = \sum_{j=1}^K \delta[x_n^j, x_n^k]$ is the number of times an identical replica of $x_n^k$ appears in the particle set. The goal can be considered to be solving $\hat{w}_{n+1}$ with fixed per-observation computational complexity. To this aim, only pick the K particles are picked. This introduces the constraint $\Sigma_{k=1}^K w_n^k = 1$. With this constraint being added as a Lagrange multiplier $\lambda$ to $\hat{W}_{n+1}$, and substituting for $\mathcal{L}[w_n]$ we end up with the following formulation:

$$\hat{w}_{n+1} = \underset{w_n \in \Delta K \times M_n}{\operatorname{argmin}} \, -\zeta_n \langle w_n, \nabla_w l_{n+1} \rangle + \mathcal{L}[w_n] + \lambda \left( \sum_{k=1}^K w_n^k - 1 \right).$$

The loss function can be defined as the average of the predictive log-likelihood over the space of the environment space parameters $w_n \in \Delta_n^{K \times M_n}$ as in the following equation:

$$l_{n+1}(w_n) = -\int_{w_n \in \Delta_n^{K \times M_n}} \log(P_{n+1}^w) dw_n$$

where $P_{n+1}^w$ is consistent with the formulation of:

$$\log(P_{n+1}^w) = \log(\mathcal{F}_{n+1}) - \Phi_{n+1}^w \text{ and } \Phi_{n+1}^w = \log(Z_{n+1}^w).$$

By several computational steps, the following algorithm is achieved:

$$P_n(x, y, \theta) = P(\theta) \prod_n P(y_n | x_n, \theta) P(x_n | x_{n-1}, \theta).$$

Using this online inference approach there has been an observed 5% higher prediction rate of shellcode compared to non-online versions of the algorithm. The non-online version of the algorithm is when discounting factors $\{\zeta_n\} = 0$. Moreover this online inference algorithm benefits from fixed per-observation computational complexity as well as inferential benefits of MC and variational Inference methodology. The convergence of the approximated posteriors Q to the target posteriors P is guaranteed for $K \to \infty$.

In response to a determination, by the shellcode detector 114, that the computer file contains shellcode, the computer system 102 can be configured to prohibit execution or further execution of the computer file. In some variations, the computer system 102 can be configured to transmit the computer file to a sandbox environment for additional analysis.

In response to detecting shellcode, the system can provide the location of the shellcode. The location of the shellcode can be provided in terms of the function entry points.

Figure 8:
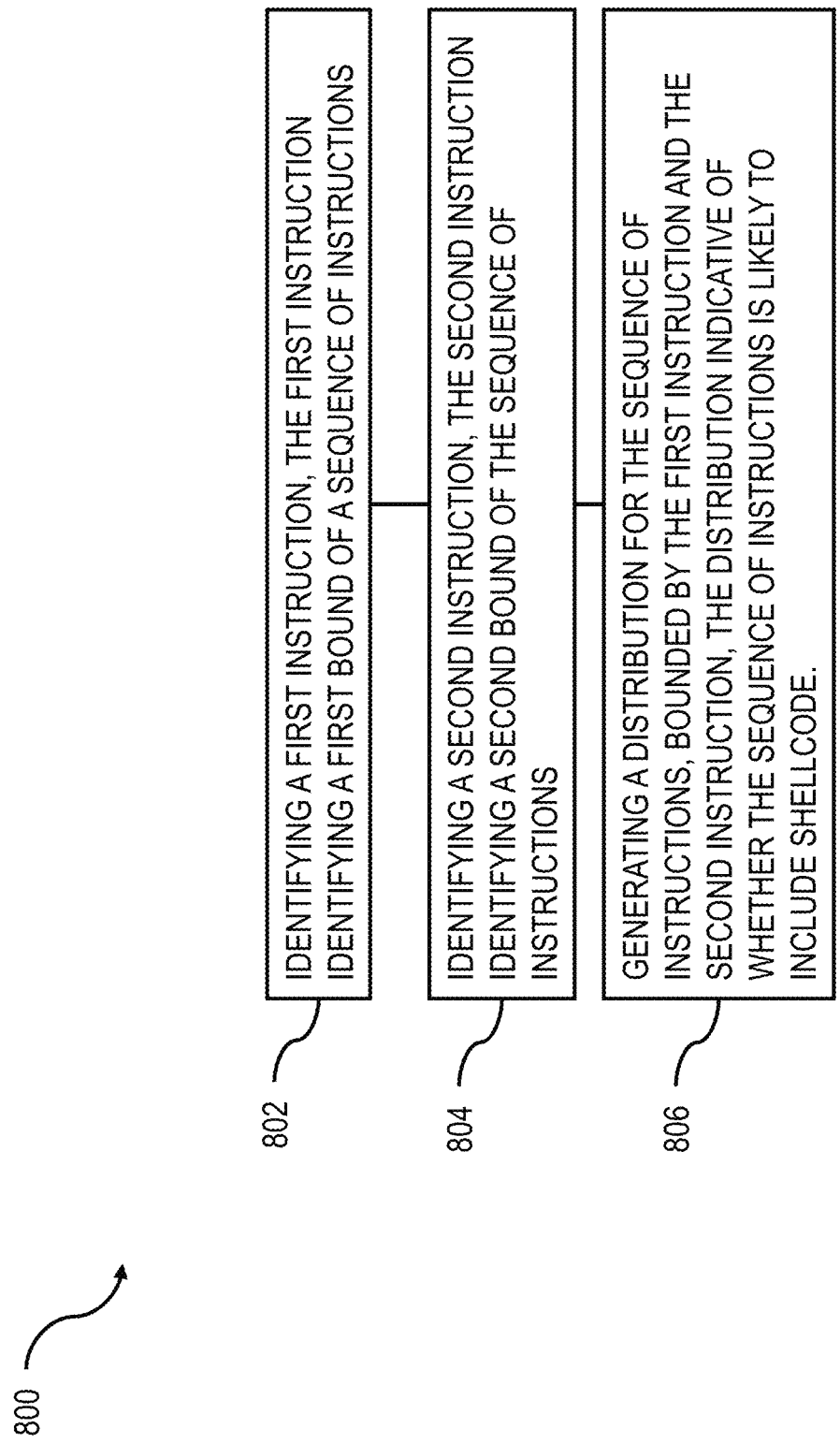
FIG. 8 illustrates a method for detecting shellcode within a computer file, in accordance with one or more features of the currently described subject matter; and, FIG. 9 illustrates a method for identifying instructions within a computer file, in accordance with one or more features of the currently described subject matter.

FIG. 8 illustrates a method 800 for detecting shellcode within a file. The operations described in method 800 can be performed by one or more of the hardware, firmware, and/or software components described herein, or other components.

At 802, a first instruction in a file can be identified. The first instruction can identify a first bound of a sequence of instructions. In some variations, a sequence of instructions can form a block of code. In some variations, the sequence of instructions can be instructions received over a network, such as the Internet. The sequence of instructions can be non-contiguous instructions. The first instruction can include an instruction indicative of a start of a sequence of instructions that is likely to include shellcode. For example, the first instruction may include an identification of a first location in memory. The identification of the first location may be referenced by the displacement field and/or the immediate field of the instructions. In another example, the first instruction may include a mnemonic indicative of a start of a sequence of shellcode instructions.

At 804, a second instruction in the file can be identified. The second instruction can identify a second bound of the sequence of instructions. The second instruction can bound the sequence of instructions. The second instruction can include an instruction indicative of an end of a sequence of instructions that is likely to include shellcode. For example, the second instruction may include an identification of a second location in memory. The identification of the second location may be referenced by the displacement field and/or the immediate field of the instructions. In another example, the first instruction may include a mnemonic indicative of an end of a sequence of shellcode instructions.

At 806, a distribution for the sequence of instructions can be generated. The distribution can be indicative of whether the sequence of instructions is likely to include shellcode. Sellcode can include a shellcode instruction referencing the identification of the first location in memory. The shell-code can include a position-independent instruction referencing the identification of the first location in memory. A position-independent instruction can be an instruction that does not depend on a reference to an actual location, but instead references a location specified by a previous instruction. The distribution can be obtained using a mnemonic distribution analyzer, such as mnemonic distribution analyzer 112 illustrated in FIG. 1. A non-parametric, non-Markovian Bayesian approach can be used to model a sequence of the tags disposed in the sequence of instructions of the file. In some variations, a sequence memoizer can be used to determine the distribution of the code of the file.

Whether the sequence of instructions is likely to include shellcode can be determined by calculating a perplexity value from a perplexity metric. The perplexity metric provides a measurement of how difficult it is to predict following instructions given a set of previous instructions in the sequence of instructions. A perplexity value exceeding a perplexity threshold can indicate that the sequence of instructions contains shellcode. The perplexity threshold can be a predefined threshold. The perplexity threshold can be based on a determination by machine learning algorithms having analyzed a plurality of computer files. The perplexity threshold can be a threshold that is based on an average perplexity level of the computer file in which the analyzed sequence of instructions resides.

Determining whether a sequence of instructions, of a computer file, is likely to include shellcode can be performed using a computer system trained using a machine-learning model. The machine-learning model can be configured to identify shellcode embedded within the computer file. The machine-learning model can be non-parametric. The machine-learning model need not require a particular form of the tags, or mnemonics, nor a particular frequency distribution of the tags within the sequence of instructions.

The machine-learning model can be non-Markovian. The machine-learning model can use observed distributions of tags in a section of the sequence of instructions to determine a prediction of the distribution of the tags in other sections of the sequence of instructions. The machine-learning model can be a non-parametric machine-learning model. An example of a non-parametric, non-Markovian machine-learning model can include a sequence memoizer.

When shellcode is detected in a computer file, the computer file can be prohibited from being executed by the computer system, such as computer system 102. In some variations, the computer system 102 can quarantine the computer file. The computer file can be sent to a sandbox environment where it can be executed in isolation from the rest of the computer system 102. The effects of the suspected shellcode can be monitored in the sandbox environment to verify that the shellcode exists and discern other information about the shellcode.

Figure 9:
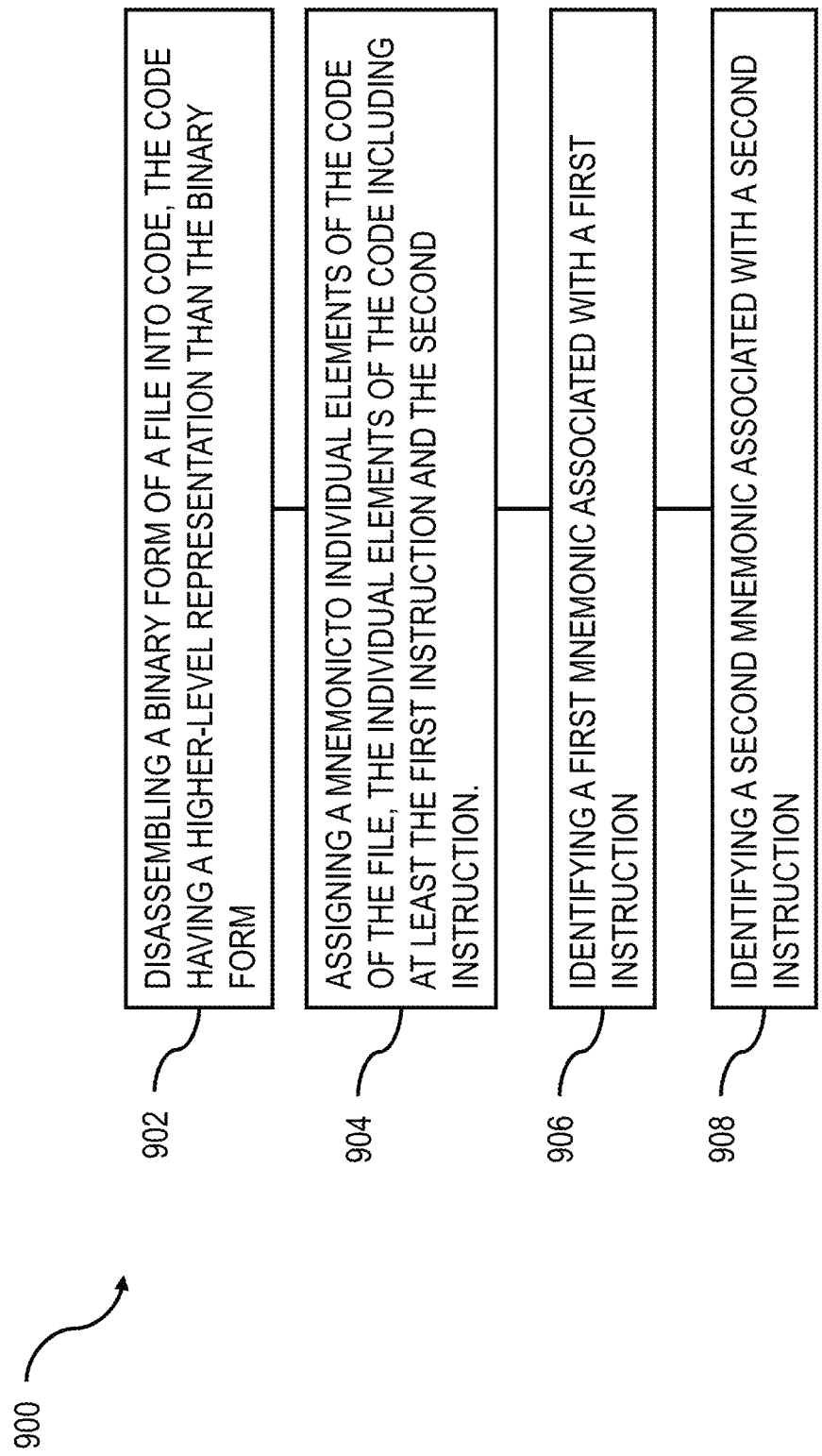

FIG. 9 illustrates a method 900 for identifying the first instruction and the second instruction. The operations described in method 900 can be performed by one or more of the hardware, firmware, and/or software components described herein, or other components.

At 902, the binary form of the file can be disassembled into code. The code can have a higher-level language than the binary form. The higher-level language code can follow one or more widely recognized standards. For example, the binary form of the computer file can be disassembled into lexical tokens or text. The binary form of the computer file can be disassembled by a binary disassembler, such as binary disassembler 106, illustrated in FIG. 1. The computer file can include data, a program, a content file, an archive, an executable, a script, or the like. The computer file can be data 118 stored on a data repository 120. The data repository 120 can include memory configured to store information belonging to an organization or to multiple different organizations in a tenant-based data repository environment. The computer file can include data flowing across a network 122 associated with the computer system 102. In response to the data coming into contact with the computer system 102, the computer system 102 can be configured to analyze the data for the inclusion of shellcode.

At 904, a tag can be assigned to individual elements of the code of the file. The individual elements of the code can include at least the first instruction and the second instruction. Binary strings representative of a particular character or instruction can be assigned a tag. In some variations, the existence of shellcode in a file can be readily apparent from the tags in the shellcode portion. In such instances, the file can be immediately prohibited from execution and/or further execution, transmitted to a sandbox environment for further analysis, or the like.

At 906, a first tag associated with the first instruction can be identified. In some variations, an instruction referencing a location in memory can have a particular tag. In an exemplary embodiment, the tag can be a mnemonic. An example, of a mnemonic to the first instruction can include *XXX when the instruction includes an indication of a location in memory. In other variations, the first tag can be mnemonic indicating a PUSH or CALL instruction.

At 908, a second tag associated with the second instruction can be identified. In some variations, the tag assigned to the second instruction can be the same as the tag assigned to the first instruction. In some variations, the tags assigned to the different instructions may be different. The tags assigned to the second instruction can be a mnemonic. The mnemonic can be an indication of the binary instruction associated with that mnemonic.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   identifying a first instruction, the first instruction identifying a first bound of a sequence of instructions;
   identifying a second instruction, the second instruction identifying a second bound of the sequence of instructions;
   generating a distribution for the sequence of instructions, bounded between the first bound and the second bound, the distribution indicative of whether the sequence of instructions is likely to include shellcode;
   determining, based on the distribution and by at least one machine-learning model, a likelihood of whether the sequence of instructions is likely to include shellcode; and
   preventing the sequence of instructions from being executed if it determined that the sequence of instructions is likely to include shellcode.

2. The method according to claim 1, wherein the first instruction includes an identification of a first location in memory and the second instruction includes an identification of a second location in memory.

3. The method according to claim 2, wherein the shellcode includes a position-independent instruction referencing the identification of the first location in memory.

4. The method according to claim 1, wherein the first instruction and the second instruction are in a file and the identifying of the first instruction and the identifying of the second instruction further comprises:
   disassembling a binary form of the file into code, the code having a higher-level representation when compared to the binary form.

5. The method according to claim 4, wherein the identifying of the first instruction and the identifying of the second instruction further comprises:
   assigning a mnemonic to individual elements of the code of the file, the individual elements of the code including at least the first instruction and the second instruction, wherein the identifying of the first instruction includes identifying a first mnemonic associated with the first instruction, and wherein the identifying of the second instruction includes identifying a second mnemonic associated with the second instruction.

6. The method according to claim 1, wherein the distribution is a conditional probability distribution.

7. The method according to claim 1, wherein the determining of the likelihood includes assigning a score to the sequence of instructions.

8. The method according to claim 7, wherein the score is a perplexity score indicative of a level of difficulty to generate a prediction of the distribution.

9. The method according to claim 1, wherein the at least one machine-learning model is assumptionless as to a form of and as to a frequency distribution of one or more mnemonics within the sequence of instructions, based on observed distributions of the one or more mnemonics in a first section of the sequence of instructions.

10. The method according to claim 9, wherein the at least one machine learning model determines, based on the observed distributions of the one or more mnemonics in the first section of the sequence of instructions, a prediction of the frequency distribution of the one or more mnemonics in a second section of the sequence of instructions.

11. The method according to claim 1, wherein the at least one machine-learning model is a non-parametric and non-Markovian machine-learning model.

12. The method according to claim 1, wherein the at least one machine-learning model comprises a sequence memoizer.

13. The method according to claim 1, wherein the at least one machine-learning model comprises an online inference model.

14. The method according to claim 1, wherein the sequence of instructions includes instructions and data.

15. The method according to claim 1, wherein the sequence of instructions is inclusive of one or more of the first instruction and the second instruction.

16. The method according to claim 1, wherein the sequence of instructions is exclusive of one or more of the first instruction and the second instruction.

17. A system comprising:
at least one processor; and
at least one memory including program code which when executed by the at least one processor causes operations comprising:
identifying a first instruction, the first instruction identifying a first bound of a sequence of instructions;
identifying a second instruction, the second instruction identifying a second bound of the sequence of instructions;
generating a distribution for the sequence of instructions, bounded between the first bound and the second bound, the distribution indicative of whether the sequence of instructions is likely to include polymorphic shellcode, the polymorphic shellcode being configured to mutate its internal structure in order to avoid detection;
determining, based on the distribution and by at least one machine-learning model, a likelihood of whether the sequence of instructions is likely to include shellcode; and
preventing the sequence of instructions from being executed if it determined that the sequence of instructions is likely to include shellcode.

18. The system according to claim 17, wherein:
the first instruction includes an identification of a first location in memory and the second instruction includes an identification of a second location in memory; and
the shellcode includes a position-independent instruction referencing the identification of the first location in memory.

19. The system of claim 17, wherein the machine learning model is a sequence memoizer.

20. A non-transient computer readable medium containing program instructions which, when executed by at least one processor, cause the at least one processor to perform one or more operations, the operations comprising:
identifying a first instruction, the first instruction identifying a first bound of a sequence of instructions;
identifying a second instruction, the second instruction identifying a second bound of the sequence of instructions;
generating a distribution for the sequence of instructions, bounded between the first bound and the second bound, the distribution indicative of whether the sequence of instructions is likely to include shellcode;
determining, based on the distribution and by a machine-learning model, a likelihood of whether the sequence of instructions is likely to include shellcode; and
preventing the sequence of instructions from being executed if it determined that the sequence of instructions is likely to include shellcode;
wherein the machine learning model determines, based on observed distributions of one or more mnemonics in a first section of the sequence of instructions, a prediction of a frequency distribution of the one or more mnemonics in a second section of the sequence of instructions.

* * * * *